US011922450B2

(12) United States Patent
Bain et al.

(10) Patent No.: US 11,922,450 B2
(45) Date of Patent: *Mar. 5, 2024

(54) SYSTEM AND METHOD FOR MULTI-CONNECTION POINT OF SALE TERMINAL FOR ACTIVITY TRACKING

(71) Applicant: American Express Travel Related Services Company, Inc., New York, NY (US)

(72) Inventors: Sara Bain, New York, NY (US); I-Hsin Chuang, Brooklyn, NY (US); Marisa Walster, Brooklyn, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,961

(22) Filed: Apr. 4, 2022

(65) Prior Publication Data

US 2022/0222698 A1 Jul. 14, 2022

Related U.S. Application Data

(63) Continuation of application No. 15/352,244, filed on Nov. 15, 2016, now Pat. No. 11,321,730.

(60) Provisional application No. 62/255,954, filed on Nov. 16, 2015.

(51) Int. Cl.
*G06Q 30/0226* (2023.01)
*G06Q 30/0238* (2023.01)

(52) U.S. Cl.
CPC ..... *G06Q 30/0226* (2013.01); *G06Q 30/0238* (2013.01)

(58) Field of Classification Search
CPC combination set(s) only.
See application file for complete search history.

(56) References Cited

U.S. PATENT DOCUMENTS

| 6,889,198 | B2 | 5/2005 | Kawan |
| 7,096,190 | B2 | 8/2006 | Postrel |
| 7,630,926 | B2 | 12/2009 | Chakiris et al. |
| 7,665,660 | B2 * | 2/2010 | Degliantoni ........... G06Q 30/02 235/383 |

(Continued)

FOREIGN PATENT DOCUMENTS

KR 2010061098 A * 6/2010

*Primary Examiner* — Marie P Brady
(74) *Attorney, Agent, or Firm* — Sterne, Kessler, Goldstein & Fox P.L.L.C.

(57) ABSTRACT

The system is configured to monitor and operate a hybrid reward system with a multi-channel point of sale terminal. The system may perform operations including receiving, by a computer based system and via a first connection from a point of sale terminal, reward program information and transaction information in response to a reward program instrument being presented at the point of sale terminal. A transaction authorization request associated with the reward program information may be provided by the point of sale terminal, via a second connection from the point of sale terminal, to a transaction authorization system to authorize a transaction. The transaction may be initiated by a transaction instrument. The reward program instrument is at least one of a transaction instrument and a reward program indicia.

21 Claims, 2 Drawing Sheets

(56) References Cited

U.S. PATENT DOCUMENTS

| | | |
|---|---|---|
| 7,676,393 B2 | 3/2010 | Postrel |
| 7,933,841 B2 | 4/2011 | Schmeyer et al. |
| 8,010,405 B1 | 8/2011 | Bortolin et al. |
| 8,387,858 B2 | 3/2013 | Bohn et al. |
| 8,433,608 B2 | 4/2013 | Bortolin et al. |
| 8,484,078 B1 | 7/2013 | Mankoff et al. |
| 8,533,037 B2 | 9/2013 | Postrel |
| 8,608,062 B2 | 12/2013 | Emoff et al. |
| 8,615,428 B2 | 12/2013 | Postrel |
| 8,682,791 B2 | 3/2014 | Bies et al. |
| 8,701,989 B2 | 4/2014 | Lehman |
| 8,775,241 B2 | 7/2014 | Bortolin et al. |
| 8,965,784 B2 | 2/2015 | Postrel |
| 2008/0201224 A1* | 8/2008 | Owens .................. G06Q 20/12 705/14.15 |
| 2008/0235091 A1 | 9/2008 | Holliday |
| 2009/0006203 A1* | 1/2009 | Fordyce, III ......... G06Q 20/387 705/14.1 |
| 2010/0082420 A1 | 4/2010 | Trifiletti et al. |
| 2010/0094698 A1 | 4/2010 | Cawley |
| 2010/0191594 A1 | 7/2010 | White et al. |
| 2011/0010238 A1 | 1/2011 | Postrel |
| 2011/0225033 A1 | 9/2011 | Schmeyer et al. |
| 2013/0036001 A1* | 2/2013 | Wegner .................. G06Q 30/02 705/14.27 |
| 2013/0041768 A1* | 2/2013 | Llach .................... G06Q 20/28 705/17 |
| 2013/0103484 A1 | 4/2013 | McLaughlin |
| 2013/0246150 A1* | 9/2013 | Ovick .................... G06Q 20/40 705/14.26 |
| 2013/0268333 A1 | 10/2013 | Ovick et al. |
| 2014/0006121 A1 | 1/2014 | Barker |
| 2014/0330721 A1 | 11/2014 | Wang |
| 2014/0365301 A1 | 12/2014 | Rappaport et al. |
| 2015/0088626 A1* | 3/2015 | Salmon ................ G06Q 20/227 705/14.17 |
| 2015/0149272 A1 | 5/2015 | Salmon et al. |
| 2015/0235255 A1 | 8/2015 | Desai et al. |
| 2015/0310477 A1* | 10/2015 | Mankoff ............ G06Q 30/0226 705/14.27 |
| 2016/0027034 A1 | 1/2016 | Kim |
| 2017/0140413 A1 | 5/2017 | Bain et al. |

* cited by examiner

SYSTEM AND METHOD FOR MULTI-CONNECTION POINT OF SALE TERMINAL FOR ACTIVITY TRACKING

CROSS-REFERENCE TO RELATED APPLICATIONS

This application is a continuation of U.S. Ser. No. 15/352,244, filed on Nov. 15, 2016, which claims priority to U.S. Ser. No. 62/255,954 filed on Nov. 16, 2015 and titled "SYSTEM AND METHOD FOR MULTI-CONNECTION POINT OF SALE TERMINAL FOR ACTIVITY TRACKING," the contents of which are herein incorporated by reference.

FIELD

The present disclosure generally relates a multi-channel point of sale terminal and computer based system for transaction or activity tracking.

BACKGROUND

Punch card or point loyalty program models have been used by merchants to reward loyal customers, for example, customers that make repeat purchases. Deal site reward programs have been used as a way for merchants to gain exposure from consumers. However, deal site incentives for consumers do not necessarily encourage repeat purchases by consumers. As such, there is a need for a reward program that leverages existing payment infrastructure to transform that payment infrastructure into a reward program acquisition infrastructure that rewards and encourages continued patronage of merchants.

SUMMARY

In various embodiments, a system, method and article of manufacture (collectively, "the system") are provided to monitor and operate a hybrid reward system with a multi-channel point of sale terminal. The system may be configured to perform operations including receiving, by a computer based system and via a first connection from a point of sale terminal, reward program information and transaction information in response to a reward program instrument being presented at the point of sale terminal. A transaction authorization request associated with the reward program information may be provided by the point of sale terminal, via a second connection from the point of sale terminal, to a transaction authorization system to authorize a transaction. The transaction may be initiated by a transaction instrument. The reward program instrument is at least one of the transaction instrument or a reward program indicia.

In various embodiments, the system may capable of analyzing, by the computer based system and via the reward engine, the reward program information and the transaction information to determine an amount of rewards points for a reward program. The system may also be capable of modifying, by the computer based system, a reward database to reflect an increase in a balance of reward point based on analyzing. The balance of reward points may be updated in real-time and in response to the authorization of the transaction. The system may further be capable of analyzing, by the computer based system and via a purchase tracking engine, the reward program information and the transaction information to determine a number of transactions with a merchant. The system may be capable of modifying, by the computer based system, a purchase tracking database to reflect an increase in the number of purchases at a merchant.

In various embodiments, the transaction instrument may be at least one of a transaction account indicia, an electronic wallet, a transaction enabled fob, or a transaction card. The reward program indicia may be at least one reward program card, or a digital token.

In various embodiments, the system may be capable of transmitting a notification to a user device in response to at least one of a modification of the reward database or a modification to the purchase tracking database. The system may also be capable of authorizing the transaction by the transaction authorization system. The system may further be capable of transmitting an indication of the authorizing of the transaction to the reward engine. The system may also be capable of transmitting an indication of the authorizing of the transaction to the purchase tracking engine.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

Figure 1:
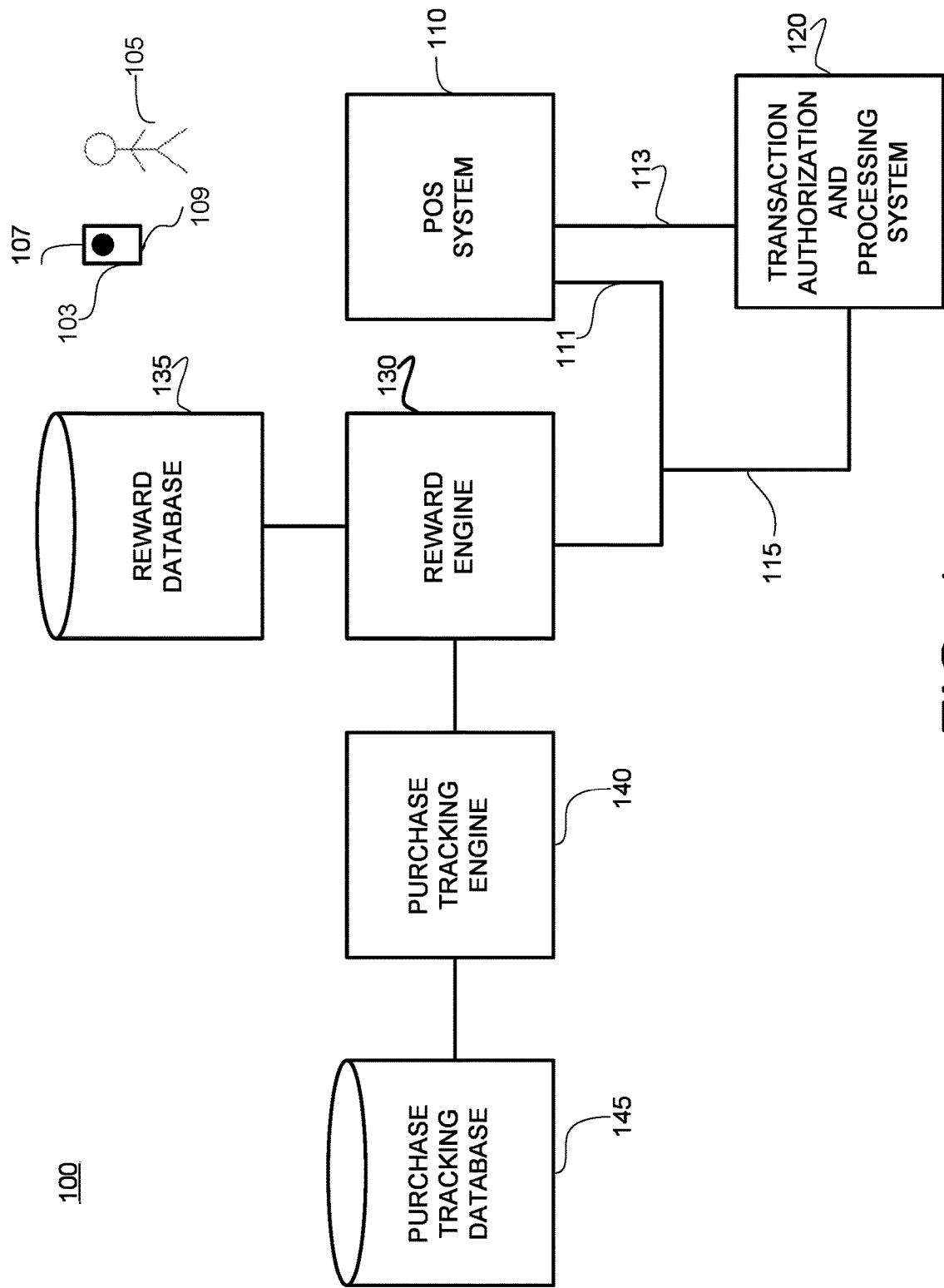
FIG. 1 shows an exemplary system diagram, in accordance with various embodiments.
Figure 2:
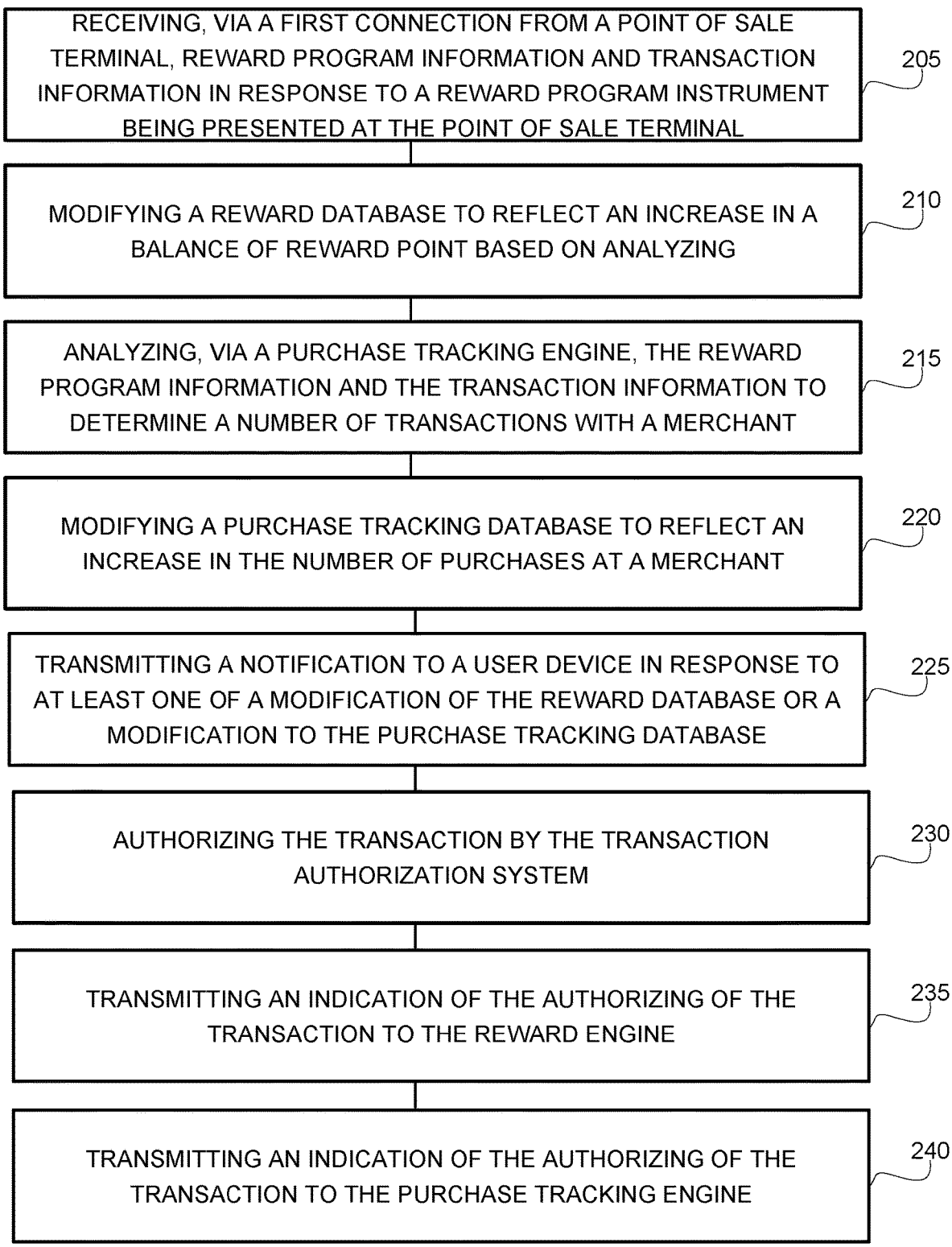
FIG. 2 shows a flowchart depicting an exemplary process for activity or transaction tracking with a multi-channel point of sale system, in accordance with various embodiments.

The present disclosure generally relates to activity tracking, and more particularly, a multi-channel point of sale system and hybrid reward system that is configured to reward points and track purchase frequency. The detailed description of various embodiments herein makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, a hybrid reward program may comprise a reward engine 130 and purchase tracking engine 140. Reward engine 130 may be operatively coupled to and in electronic communication with reward database 135. Purchase tracking engine 140 may be operatively coupled to and in electronic communication with purchase tracking database 145. Hybrid reward system 100 may be operatively coupled to and in electronic communication with a point of sale system 110 via a first electronic communication 111. Point of sale system 110 may also be in electronic communication with a transaction authorization and processing system 120 via a second electronic communication 113.

In various embodiments, point of sale system 110 may comprise a traditional transaction account (e.g., credit card) authorization and/or rail connection 113. Connection 113 may be configured to present transaction information and/or request for authorization for transactions from a transaction authorization and processing system 120. This transaction authorization and processing system may comprise credit account, debit account, and/or charge account processing elements to authorize, process, and/or settle financial transactions. Transaction authorization and processing system 120 may also comprise a separate communication line 115 to hybrid rewards system 100. In this regard, transaction authorization and processing system 120 may be configured to provide authorization, processing, and/or settlement information via communication line 115 to hybrid reward system 100.

In various embodiments, a user 105 may have a payment instrument and/or a reward instrument 107. Payment instrument 107 may be any typical transaction initiation instrument or indicia including, for example, a financial transaction indicia, a transaction card, a digital wallet, and/or the like. Moreover, user 105 may also present a reward program indicia 109. Reward program indicia 109 may include transaction account indicia 107, a reward program indicia, a digital token, and/or the like. In various embodiments, the reward program indicia may be presented to a point of sale system 110 and communicated over a reward communication protocol 111 to at least one of reward engine 130 and/or purchase tracking engine 140 to impact information stored in reward database 135 and/or purchase tracking database 145, respectively. In this regard, interaction with the point of sale terminal with point of sale system 110 by user 105 with reward program indicia 109 transforms the primary purpose of point of sale system 110 from traditional transaction authorization to reward program tracking.

In various embodiments, point of sale system 110 may comprise a controller 117 that is configured to route data packets between reward communication protocol 111 and communication line 115. In this regard, controller 117 may be configured to analyze, parse, and/or modify data packets created by point of sale system 110 to provide necessary data to each of transaction authorization and processing system 120, reward engine 130, and/or purchase tracking engine 140. Controller 117 may be configured to interface with APIs for each of the various systems and engines. Controller 117 may also be configured to condition data based on the system that is receiving the data.

In various embodiments, hybrid reward program system 100 may configured to implement and/or carry out various operations of a method 200. In various embodiments method 200 may comprise receiving, via a first connection and from point of sale terminal 110, reward program information and transaction information in response to reward program account (e.g., associated with an instrument) 109 being presented at point of sale terminal 110 (Step 205). A transaction authorization request may be associated with the reward program information that is provided to point of sale terminal 110. This transaction authorization request may be transmitted via second connection 113 from the point of sale terminal 110 to transaction authorization and processing system 120 to authorize the transaction. The transaction may be initiated by transaction instrument 107. The reward program instrument may be at least one of a transaction instrument 107 and/or a reward program indicia 109, as discussed herein.

In various embodiments, method 200 may further comprise analyzing, via a reward engine 130, the reward program information and the transaction information to determine an amount of reward points for a reward program (Step 210). The reward engine 130 may be configured to implement any variety of business rules to determine an amount of reward for a particular transaction. For example, the reward engine 130 may be configured to implement a business rule that calculates a particular amount of reward points based on an amount of a transaction, a time period in which a transaction occurred, a geographic region within in which a transaction occurred, an item purchased with a transaction, and/or the like.

In various embodiments, method 200 may further comprise modifying reward database 135 to reflect an increase in a balance of reward points based on the analyzing (Step 215) from Step 210. The reward point balance may be updated in real time and in response to the authorization of the transaction by transaction authorization and processing system 120. The update may be transmitted, in real time, to a user 105 via a user device and/or via a channel associated with the user. This transmission to the user may be triggered by the modifying of reward database 135.

In various embodiments, method 200 may further comprise analyzing, via purchase tracking engine 140, the reward program information and the transaction information to determine a number of transactions with a merchant (Step 215). In this regard, purchase tracking engine 140 may be configured to monitor a frequency of transactions with a particular merchant to impact a punch card style or frequency style reward program. For additional information about frequency based rewards please see U.S. patent application Ser. No. 14/254,269, entitled SYSTEM AND METHOD FOR FREQUENCY BASED REWARDS, which is hereby incorporated by reference in its entirety for any purpose. This information may be communicated directly to purchase tracking engine 140 via the first electronic communication connection 111 from point of sale system 110. In various embodiments, method 200 may further comprise modifying purchase tracking database 145 to reflect an increase in the number of purchases at a merchant (step 220).

In various embodiments, transaction instrument 107 may be at least one of a transaction account indicia, electronic wallet, a transaction enabled FOB, a transaction card, and/or the like. Reward program indicia 109 may be associated with at least one of a reward program card, a digital token, an account indicia, transaction instrument 107 and/or the like.

In various embodiments, method 200 may further comprise transmitting a notification to a user device 103 based on and/or in response to at least one of a modification of reward database 135, purchase tracking database 145, an action at purchase tracking engine 140, an action at reward engine 130, an action at transaction authorization and processing system 120, and/or the like (Step 225). Hybrid reward system 100 may be configured to provide notifications of communications over first communication protocol 111 and/or second communication protocol 113 from POS system 110. In this regard, hybrid reward system 100 may be configured to provide a user with information about reward activities, transaction frequency information, merchant information, and/or transaction activities.

In various embodiments, method 200 may further comprise authorizing the transaction by the transaction authorization and processing system 120 (step 230). Transaction authorization and processing system 120 may be typical transaction authorization, processing, and/or settlement system operated by a transaction account issuer or provider including, for example, a bank, a payment processor, and/or the like. Moreover transaction authorization and processing system 120 may be modified and/or transformed to integrate with a hybrid reward program 110 having parallel communications with both the point of sale system 110 and transaction authorization and processing system 120. Transaction authorization and processing system 120 may also have a direct communication link 113 to POS system 110.

In various embodiments, method 200 may further comprise transmitting an indication of the authorizing of the transaction to reward engine 130 (Step 235). The indication of authorization may be provided by transaction authorization and processing system 120 via electronic communication channel 115. Reward engine 130 may use this authorization as an indication that the transaction is conditionally approved and therefore may provide reward points to reward database 135.

In various embodiments, method 200 may further comprise transmitting an indication of authorization of the transaction to purchase tracking engine 140 (Step 240). In this regard, transaction authorization and processing system 120 may provide this authorization to purchase tracking engine 140 via communication protocol 115. Based on the indication of authorization, tracking engine 140 may confirm that a transaction is eligible as a purchase from a particular merchant causing purchase tracking engine 140 to modify purchase tracking database 145.

In various embodiments, the systems and methods described herein are configured to and/or are capable of tailored marketing, creating real-time predictions, creating forward-looking propensities, and/or determining real-time recommendations or expected behaviors based on diverse and massive data sources that can be analyzed and manipulated in a big data analytical environment or a performance marketing cluster. The systems and methods described herein may be used as part of prospect look-a-like modeling, customer persona modeling, and/or the like. In this regard, the diverse data sources may be analyzed as part of a transfer function that is configured to or capable of predicting the behavior of an unknown customer based on data about the customer matching or being similar to behaviors seen by known customers in the rich data being analyzed in the analytical environment.

The phrases consumer, customer, user, account holder, account affiliate, cardmember or the like may be used interchangeably and shall include any person, group, entity, business, organization, business, software, hardware, machine and/or combination of these, and may, in various embodiments, be associated with a transaction account, buy merchant offerings offered by one or more merchants using the account and/or be legally designated for performing transactions on the account, regardless of whether a physical card is associated with the account. For example, a consumer or account affiliate may include a transaction account owner, a transaction account user, an account affiliate, a child account user, a subsidiary account user, a beneficiary of an account, a custodian of an account, and/or any other person or entity affiliated or associated with a transaction account.

A bank may be part of the systems described herein, and the bank may, in various embodiments, represent other types of card issuing institutions, such as credit card companies, card sponsoring companies, or third party issuers under contract with financial institutions. It is further noted that other participants may be involved in some phases of a transaction, such as an intermediary settlement institution.

Phrases and terms similar to "business," "merchant," "service establishment," or "SE" may be used interchangeably with each other and shall mean any person, entity, distributor system, software and/or hardware that is a provider, broker and/or any other entity in the distribution chain of goods or services. For example, a merchant may be a grocery store, a retail store, a restaurant, a travel agency, a service provider, an on-line merchant and/or the like. In various embodiments, a merchant may request payment for goods and/or services sold to a customer or consumer who holds an account with a transaction account issuer.

Terms such as "transmit," "communicate" and/or "deliver" may include sending electronic data from one system component to another over a network connection. Additionally, as used herein, "data" may include information such as commands, queries, files, data for storage, and/or the like in digital or any other form.

A "transaction" may include one or more approved authorizations. Moreover, the phrase "transaction data" may comprise data associated with one or more transactions. In various embodiments, an authorization may be approved by a payment processor in response to a transaction request, which may be initiated by a consumer and/or a merchant. Various embodiments may be described with respect to "purchases"; however, the system contemplates any transaction in association with the system.

Phrases and terms similar to "item" may include any good, service, information, experience, data, content, access, rental, lease, contribution, account, credit, debit, benefit, right, reward, points, coupons, credits, monetary equivalent, anything of value, something of minimal or no value, monetary value, offer, merchant, type of merchant, demographic data, preference data, consumer profile data, consumer profile, type of transaction account, transaction account, period of time (e.g., a period of time a consumer has been a customer of a transaction account issuer), size of wallet, share of wallet, information, and/or the like. Further, in various embodiments, an item may comprise an input to and/or an output of a recommendation algorithm.

An "offer" may comprise any data and/or information. An offer may comprise one or more items. In addition, an offer may comprise data associated with one or more items. An offer may further comprise one or more characteristics or metadata. The characteristics or metadata associated with an offer may describe one or more attributes associated with the offer. Further, in various embodiments, an offer may comprise an offer to purchase good or service offered for sale by a merchant or SE. Similarly, in various embodiments, an offer may be associated with a merchant or SE.

A "record of charge" or "ROC" may comprise any transaction, transaction data, a record of a transaction or charge by a consumer with a particular merchant. The ROC may be a unique identifier associated with a transaction. A transaction may, in various embodiments, be performed by a one or more members using a transaction account, such as a transaction account associated with a gift card, a debit card, a credit card, and the like. A ROC may, in addition, contain details such as location, merchant name or identifier, transaction amount, transaction date, account number, account security pin or code, account expiry date, and the like for the transaction. In various embodiments, a ROC may correspond to an individual transaction. Further, in various embodiments, a ROC may comprise a cumulative value, which may indicate a number of total transactions (e.g., purchases) a consumer has made with a particular merchant. Further still, in various embodiments, a ROC may simply comprise an indication that a consumer has conducted at least one transaction with a merchant (e.g., within a particular time period). For instance, where a consumer's transaction history shows that the consumer has made at least one purchase from a merchant (e.g., within 12 months), a ROC may simply comprise a binary value, such as a "1" or a "yes." Conversely, where a consumer's transaction history indicates that a consumer has not made a purchase from a merchant, a ROC may simply comprise a value such as a "0" or a "no".

Phrases and terms similar to "account," "transaction account," "account," "account number," "account code," and/or "consumer account" may include any account that may be used to facilitate a transaction (e.g., financial transaction). These accounts may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card and/or an associated account.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at from EMVCo.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument" and/or the plural form of these terms may be used interchangeably throughout to refer to a financial instrument.

Phrases and terms similar to "internal data" or "closed loop data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows OS, Mac OS, Linux OS, and/or the like) as well as various conventional support software and drivers typically associated with computers. A user may include any individual, business, entity, government organization, software and/or hardware that interact with a system.

In various embodiments, various components, modules, and/or engines of system 100 may be implemented as micro-applications or micro-apps. Micro-apps are typically deployed in the context of a mobile operating system, including for example, a Windows mobile operating system, an Android Operating System, Apple iOS, a Blackberry operating system and/or the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, NY), various database products available from Oracle Corporation (Redwood Shores, CA), Microsoft Access or Microsoft SQL Server by Microsoft Corporation (Redmond, Washington), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in various embodiments, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks.

Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and/or the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. Web Sphere MQTM (formerly MQSeries) by IBM, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and/or the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and/or the like. Still further, the system could be used to detect or prevent security issues with a client-side scripting language, such as JavaScript, VBScript or the like.

With further regard to terms such as "consumer," "customer," "merchant," and/or the like, each of these participants may be equipped with a computing device in order to interact with the system and facilitate online commerce transactions. A consumer or customer may have a computing unit in the form of a personal computer, although other types of computing units may be used including laptops, notebooks, hand held computers, set-top boxes, cellular telephones, touch-tone telephones and/or the like. A merchant may have a computing unit implemented in the form of a computer-server, although other implementations are contemplated by the system. A bank may have a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein A merchant computer and/or a bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

An electronic commerce system may be implemented at the customer and issuing bank. In an exemplary implementation, the electronic commerce system may be implemented as computer software modules loaded onto the customer computer and the banking computing center. The merchant computer may not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, web sites, web forms, prompts, etc. Practitioners will appreciate that the illustrated steps described herein may comprise in any number of configurations including the use of windows, webpages, web forms, popup windows, prompts and/or the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

The disclosure and claims do not describe only a particular outcome of applying rewards, but the disclosure and claims include specific rules for implementing the outcome of applying rewards and that render information into a specific format that is then used and applied to create the desired results of applying rewards, as set forth in McRO, Inc. v. Bandai Namco Games America Inc. (Fed. Cir. case number 15-1080, Sep. 13, 2016). In other words, the outcome of applying rewards can be performed by many different types of rules and combinations of rules, and this disclosure includes various embodiments with specific rules. While the absence of complete preemption may not guarantee that a claim is eligible, the disclosure does not sufficiently preempt the field of applying rewards at all. The disclosure acts to narrow, confine, and otherwise tie down the disclosure so as not to cover the general abstract idea of just applying rewards. Significantly, other systems and methods exist for applying rewards, so it would be inappropriate to assert that the claimed invention preempts the field or monopolizes the basic tools of applying rewards. In other words, the disclosure will not prevent others from applying rewards, because other systems are already performing the functionality in different ways than the claimed invention. Moreover, the claimed invention includes an inventive concept that may be found in the non-conventional and non-generic arrangement of known, conventional pieces, in conformance with Bascom v. AT&T Mobility, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-implemented method, comprising:
    establishing, by a hybrid reward system, a first connection between a point of sale terminal and the hybrid reward system;
    establishing, by a transaction authorization system, a second connection between the point of sale terminal of a merchant and the transaction authorization system;
    establishing, by the hybrid reward system, a third connection between the hybrid reward system and the transaction authorization system, the third connection being in parallel with the first connection;
    receiving, via the second connection and at the transaction authorization system, a request to authorize a transaction;
    receiving, via the first connection and at the hybrid reward system, reward program information;
    in parallel with the receipt of the reward program information, receiving, via the third connection and at the hybrid reward system, transaction information, the transaction information comprising information indicating authorization of the transaction;

in response to the receipt of the reward program information and the transaction information at the hybrid reward system:

analyzing, by the hybrid reward system, the reward program information and the transaction information to determine a reward for the transaction; and transmitting, by the hybrid reward system, updated reward program information comprising the reward and the transaction information to a user device, wherein the updated reward program information comprises at least an amount of reward points for a reward program.

2. The computer-implemented method of claim 1, further comprising:

modifying a reward database based on the reward for the transaction.

3. The computer-implemented method of claim 1, further comprising:

receiving, at a purchase tracking engine, the reward program information from the hybrid reward system and the transaction information from the transaction authorization system;

analyzing, by the purchase tracking engine, the reward program information and the transaction information to determine a number of transactions with the merchant; and modifying a purchase tracking database based on the number of transactions with the merchant.

4. The computer-implemented method of claim 1, wherein a controller is configured to route the request, the reward program information, or the transaction information among the point of sale terminal, the transaction authorization system, or the hybrid reward system.

5. The computer-implemented method of claim 1, wherein analyzing comprises:

calculating the reward based on at least one of an amount of the transaction, a time period in which the transaction occurred, a geographic region within which the transaction occurred, or an item purchased with the transaction.

6. The computer-implemented method of claim 1, wherein the transaction information is from at least one of a transaction account indicia, an electronic wallet, a transaction enabled fob, or a transaction card and the reward program information is from at least one of a reward program card, a digital token, an account indicia, or a transaction instrument.

7. The computer-implemented method of claim 1, wherein the transaction authorization system authorizes the transaction and generates the transaction information.

8. A non-transitory computer-readable medium having instructions stored thereon that, when executed by at least one computing device, cause the at least one computing device to perform operations comprising:

establishing, by a hybrid reward system, a first connection between a point of sale terminal and the hybrid reward system;

establishing, by a transaction authorization system, a second connection between the point of sale terminal of a merchant and the transaction authorization system;

establishing, by the hybrid reward system, a third connection between the hybrid reward system and the transaction authorization system, the third connection being in parallel with the first connection;

receiving, via the second connection and at the transaction authorization system, a request to authorize a transaction;

receiving, via the first connection and at the hybrid reward system, reward program information;

in parallel with the receipt of the reward program information, receiving, via the third connection and at the hybrid reward system, transaction information, the transaction information comprising information indicating authorization of the transaction;

in response to the receipt of the reward program information and the transaction information at the hybrid reward system:

analyzing, by the hybrid reward system, the reward program information and the transaction information to determine a reward for the transaction; and transmitting, by the hybrid reward system, updated reward program information comprising the reward and the transaction information to a user device, wherein the updated reward program information comprises at least an amount of reward points for a reward program.

9. The non-transitory computer-readable medium of claim 8, further comprising:

modifying a reward database based on the reward for the transaction.

10. The non-transitory computer-readable medium of claim 8, further comprising:

receiving, at a purchase tracking engine, the reward program information from the hybrid reward system and the transaction information from the transaction authorization system;

analyzing, by the purchase tracking engine, the reward program information and the transaction information to determine a number of transactions with the merchant; and modifying a purchase tracking database based on the number of transactions with the merchant.

11. The non-transitory computer-readable medium of claim 8, wherein analyzing comprises:

calculating the reward based on at least one of an amount of the transaction, a time period in which the transaction occurred, a geographic region within which the transaction occurred, or an item purchased with the transaction.

12. The non-transitory computer-readable medium of claim 8, wherein the transaction information is from at least one of a transaction account indicia, an electronic wallet, a transaction enabled fob, or a transaction card and the reward program information is from at least one of a reward program card, a digital token, an account indicia, or a transaction instrument.

13. The non-transitory computer-readable medium of claim 8, wherein the transaction authorization system authorizes the transaction and generates the transaction information.

14. A system, comprising:

at least one processor and memory; and a transaction authorization system, implemented on the at least one processor and memory, configured to (i) establish a first connection between a point of sale terminal and the transaction authorization system, and (ii) receive, via the first connection, a request to authorize a transaction;

a hybrid reward system, implemented on the at least one processor and memory, configured to (i) establish a second connection between the point of sale terminal of a merchant and the hybrid reward system, (ii) establish a third connection between the hybrid reward system and the transaction authorization system, the third connection being in parallel with the second connection, (iii) receive, via the second connection, reward program information, (iv) in parallel with the receipt of the reward program information, receive, via the third connection, transaction information, the transaction information comprising information indicating authorization of the transaction, (v) in response to the receipt of the reward program information and the transaction information, analyze the reward program information and the transaction information to determine a reward for the transaction, and (vi) transmit updated reward program information comprising the reward and the transaction information to a user device, wherein the updated reward program information comprises at least an amount of reward points fora reward program.

15. The system of claim 14, further comprising:
a reward database configured to be modified based on the reward for the transaction.

16. The system of claim 14, further comprising:
a purchase tracking engine configured to (i) receive the reward program information from the hybrid reward system and the transaction information from the transaction authorization system, and (ii) analyze the reward program information and the transaction information to determine a number of transactions with the merchant; and
a purchase tracking database configured to be modified based on the number of transactions with the merchant.

17. The system of claim 14, further comprising a controller configured to route the request, the reward program information, or the transaction information among the point of sale terminal, the transaction authorization system, or the hybrid reward system.

18. The system of claim 14, wherein the reward engine is configured to calculate the reward based on at least one of an amount of the transaction, a time period in which the transaction occurred, a geographic region within which the transaction occurred, or an item purchased with the transaction.

19. The system of claim 14, wherein the transaction information is from at least one of a transaction account indicia, an electronic wallet, a transaction enabled fob, or a transaction card and the reward program information is from at least one of a reward program card, a digital token, an account indicia, or a transaction instrument.

20. The system of claim 14, wherein the transaction authorization system is configured to authorize the transaction and generate the transaction information.

21. The computer-implemented method of claim 1, wherein analyzing the reward program information and the transaction information is based at least in part on an amount of the transaction, a time period in which the transaction occurred, a geographic region within which the transaction occurred, and an item purchased with the transaction.

* * * * *